United States Patent [19]

Utsumi

[11] Patent Number: 5,160,977
[45] Date of Patent: Nov. 3, 1992

[54] POSITION DETECTION DEVICE
[75] Inventor: Noriyuki Utsumi, Yokohama, Japan
[73] Assignee: Tokico, Ltd., Japan
[21] Appl. No.: 644,115
[22] Filed: Jan. 18, 1991
[30] Foreign Application Priority Data
 Jan. 19, 1990 [JP] Japan .................................. 2-9541
[51] Int. Cl.$^5$ ............................................. G01B 11/00
[52] U.S. Cl. .................... 356/376; 356/377; 356/394
[58] Field of Search ............... 356/375, 376, 377, 394; 33/561, 288

[56] References Cited
U.S. PATENT DOCUMENTS

| | | | |
|---|---|---|---|
| 4,701,047 | 10/1987 | Erbert et al. | 356/376 |
| 4,831,742 | 5/1989 | Struble | 33/561 |
| 4,989,981 | 2/1991 | Kawamura et al. | 356/394 |

Primary Examiner—Richard A. Rosenberger
Attorney, Agent, or Firm—Scully, Scott, Murphy & Presser

[57] ABSTRACT

A position detection device applicable to robots and other equipment used in automated assembly line manufacturing processes is disclosed. The device of the present invention provides a position detection device having a simplified construction which can rapidly and accurately establish the orientation and location of workpieces within a work space, and which is suitable for workpieces having at least two straight line edges which are not parallel with respect to one another. The device of the present invention includes first position detection means for optically, or by means of direct contact with the workpiece, mechanically detecting the point of intersection of a line containing a first straight edge among the straight edges of the workpiece and a first detection plane defined within the work space; second position detection means for similarly detecting the point of intersection of a line containing a second straight edge among the straight edges of the workpiece which is different from the first straight edge and a second and third detection plane defined within the work space; storage means for storing data representing the geometric relationship between the first straight edge and second straight edge of the workpiece; and computational means for calculating the position and orientation of the workpiece based on the data stored in the storage means and on the coordinates of the points of intersection detected by the first position detection means and second position detection means.

12 Claims, 6 Drawing Sheets

POSITION DETECTION DEVICE

BACKGROUND OF THE INVENTION

1. Field of the Invention

The present invention relates to position detection devices, and in particular, to position detection devices applicable to robots and other equipment used in automated assembly line manufacturing processes.

2. Prior Art

Various devices are conventionally known, by means of which the position of articles under manufacture on an automated assembly line can be determined, thereby permitting automated equipment for manipulating objects, assembling components, machining, etc. to appropriately orient with respect to the articles under manufacture and components thereof. Typically, these devices employ three pairs of television cameras, each television camera having associated image processing equipment used in conjunction with that camera alone, whereby three-dimensional images of each of three non-collinear reference points on the object, for example, holes or protuberances, are captured and processed. In this way, the article under manufacture is oriented with respect to a virtual Cartesian coordinate system internal to the position detection device, thereby establishing the position and location of the object in relation to the work space and manufacturing devices therein.

These conventional devices have several shortcomings, however, including the following:

1. Six television cameras and individual image processing equipment for each television camera are required, for which reason these devices tend to be highly complex and quite costly.
2. In order to accurately correlate the location of each of the reference points in the work space with coordinates determined therefor based on the composite image of the reference point obtained with a respective pair of television cameras and image processing devices, extensive and time consuming calibration is required.
3. Grey scale processing of each captured image is generally required in order to enhance contrast. For this reason, significant time delays in establishing the position of an object under manufacture must be tolerated unless highly expensive computational equipment having massive processing power is utilized. Accordingly, real-time manufacturing control is quite difficult to achieve with these conventional position detection devices.

SUMMARY OF THE INVENTION

In view of the above described limitations of conventional position detection devices, it is an object of the present invention to provide a device having a simplified construction, which can rapidly and accurately establish the orientation and location of workpieces within a work space.

To achieve the above described object, the present invention provides a position detection device for establishing the orientation and location of workpieces within a work space which is suitable for workpieces having at least two straight line edges which are not parallel with respect to one another, the device comprising:

a) first position detection means for optically, or by means of direct contact with the workpiece, mechanically detecting the point of intersection of a line containing a first straight edge among the straight edges of the workpiece and a first detection plane defined within the work space;

b) second position detection means for optically, or by means of direct contact with the workpiece, mechanically detecting the point of intersection of a line containing a second straight edge among the straight edges of the workpiece which is different from the above mentioned first straight edge and a second and third detection plane defined within the work space;

c) storage means for storing data representing the geometric relationship between the above mentioned first straight edge and second straight edge of the workpiece; and d) computational means for calculating the position and orientation of the workpiece based on the data stored in the above mentioned storage means and on the coordinates of the points of intersection detected by the above mentioned first position detection means and second position detection means.

With a position detection device constituted as described above, three intersection points are detected through the operation of the above mentioned first position detection means and second position detection means. Using the coordinates of these three intersection points in conjunction with data representing the spatial relationship of the above mentioned first and second straight edges of the workpiece, it is possible to establish the position and orientation of the workpiece within the work space. As a result, the following effects are achieved:

1. For any workpiece having two or more non-collinear straight edges, position detection can be carried out using any two of the non-collinear straight edges. For this reason, there are no particular limitations concerning the position of the device.
2. For workpieces having substantially lengthy straight edges, measurement can be carried out even when the workpiece is considerably shifted from a standard position. Thus, position detection can be accomplished over a wide range of positions with respect to the workpiece.
3. Necessary calculations are limited in number as well as in complexity, for which reason the position of a workpiece can be assessed in a very short period of time. For the same reason, processing power requirements for computational circuits incorporated in the device are minimal. Thus, the device of the present invention is applicable to manufacturing facilities employing real-time manufacturing control systems.
4. During calibration, adjustments connected with each detection plane need be carried out with respect to only two dimensions, thus considerably simplifying and accelerating calibration.
5. Contrast intensity adjustments can be carried out based on measurements taken using a standard contrast pattern. Furthermore, during processing of video or tactile data, each point on each of the detection planes can be adequately represented by a single bit binary format, that is, each bit is either on or off. Thus, since grey scale processing and the like is eliminated, data processing is markedly accelerated compared with conventional methods and processing power requirements are therefore minimal. For these reasons and considerations mentioned in #3 above, the present invention is very much applicable to manufacturing facilities employing real-time manufacturing control systems.

6. Only data describing the spatial relationship between the first and second straight edge of each workpiece for which measurements will be carried out are required. Accordingly, data storage requirements are minimal.
7. Since it is possible to carry out measurements with the apparatus of the present invention using tactile detection means, further enhancement of the accuracy of position detection is possible.

DETAILED DESCRIPTION OF THE PREFERRED EMBODIMENTS

In the following, a first preferred embodiment of the present invention will be described with reference to FIGS. 1 through 4.

Figure 1:
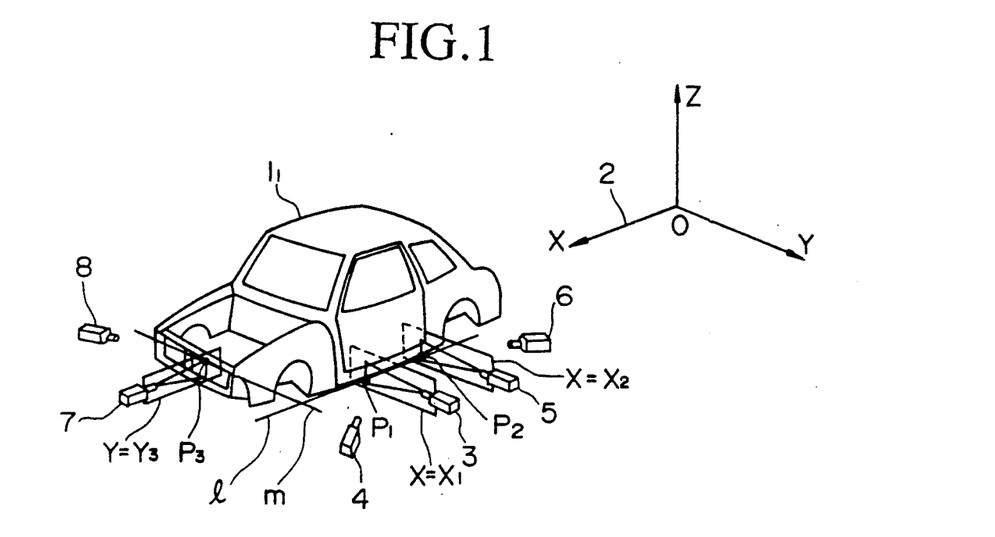
FIG. 1 is a schematic drawing showing the layout of a position detection device of a first preferred embodiment of the present invention.

In the schematic drawing of FIG. 1, one workpiece on an assembly line, workpiece $1_i$, can be seen, in this case, an automobile chassis. Although not shown in the drawing, identical with workpiece $1_i$, workpieces $1_a$, $1_b$, $1_c$, . . . are being intermittently conveyed along the assembly line positioned at predetermined intervals, such that any workpiece $1_n$ is located at a corresponding work station at a given moment when the workpiece is not in transit between two work stations. Upon arriving at a particular workstation, any workpiece $1_n$ is fixed at that location, whereupon the manufacturing operations associated with that work station are carried out. Once the manufacturing operations for that work station are completed, the workpiece $1_n$ is conveyed on to the next work station, and workpiece $1_{n-1}$ comes to take its place.

It so happens that the position and location at any work station whereat some workpiece $1_n$ comes to be fixed during a corresponding manufacturing operation is not absolutely invariant for each workpieces $1_a$, $1_b$, $1_c$, . . . , but rather, a certain amount of deviation from the ideal position and location develops at each work station, generally on the order of tens of millimeters. This deviation for any workpiece $1_n$ at a given workstation can be expressed in terms of the location and position of that workpiece $1_n$ with respect to a fixed coordinate system 2 which is fixed and centered at a standard position for any workpiece $1_a$, $1_b$, $1_c$, . . . at that work station.

In the following, the position detection device of the present embodiment will be described in terms of operations carried out on workpiece $1_i$. This choice is entirely arbitrary, however, and the explanation concerning workpiece $1_i$ holds true for any workpiece $1_a$, $1_b$, $1_c$, . . . on the same assembly line.

As shown in FIG. 1, line marker 3 projects a straight line on workpiece $1_i$. A laser light source is in general the most suitable type of light source for line marker 3. As can be seen from the diagram, the straight line projected on workpiece $1_i$ from line marker 3 lies in a plane parallel to the Y-Z plane of fixed coordinate system 2. Thus, when the X coordinate of the straight line projected on workpiece $1_i$ from line marker 3 is given by $X_1$, then this straight line lies in the plane defined by the equation $X = X_1$.

The image projected on workpiece $1_i$ by line marker 3 is captured by television camera (hereafter TV camera) 4, which is positioned such that its visual axis forms an angle with the visual axis of line marker 3. Due to the fact that the surface of workpiece $1_i$ is curved in proximity to where the straight line of line marker 3 is projected, and further in view of the angular offset between the optical axis of line marker 3 and that of TV camera 4, the image captured by TV camera 4 is curved.

In addition to the above described line marker 3 and TV camera 4, line marker 5 and corresponding TV camera 6, along with line marker 7 and corresponding TV camera 8 are provided with the device of the present embodiment. As shown in FIG. 1, the straight line projected on workpiece $1_i$ from line marker 5 lies in a plane parallel to the Y-Z plane of fixed coordinate system 2. When the X coordinate of the straight line projected on workpiece $1_i$ from line marker 5 is given by $X_2$, then this straight line lies in the plane defined by the equation $X = X_2$. Similarly, the straight line projected on workpiece $1_i$ from line marker 7 lies in a plane parallel to the X-Z plane of fixed coordinate system 2, and when the Y coordinate of the straight line projected on workpiece $1_i$ from line marker 7 is given by $Y_3$, then this straight line lies in the plane defined by the equation $Y = Y_3$.

Figure 2:
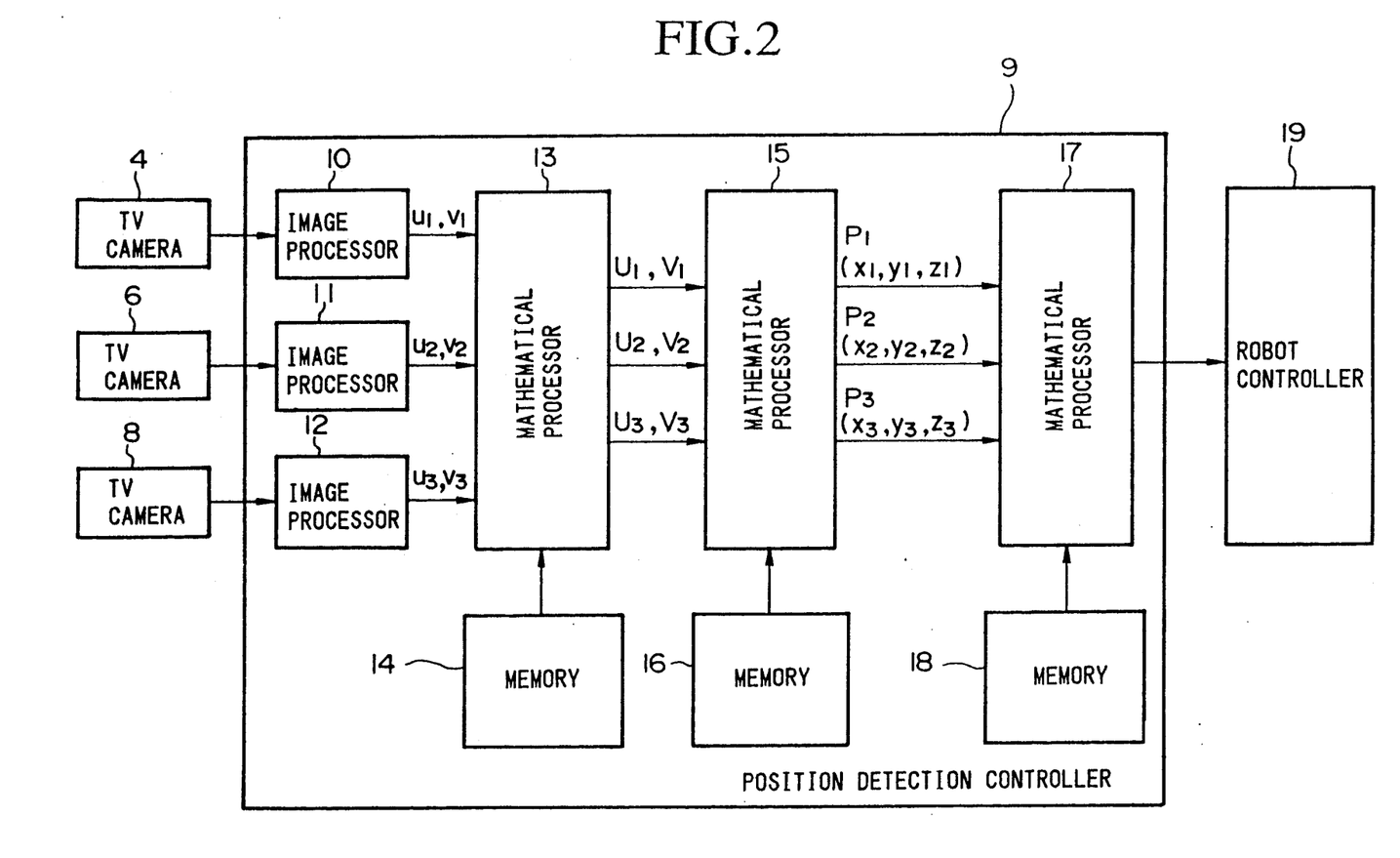
FIG. 2 is a block drawing showing a controller employed in the position detection device shown in FIG. 1.
Figure 3A:
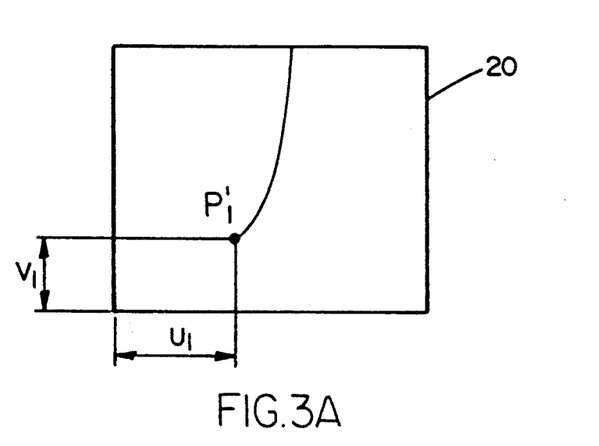
FIGS. 3(a)-3(c) are drawings demonstrating the relationship between a characteristic point detected by the apparatus shown in FIG. 1 and a display screen employed in the device.
Figure 3B:
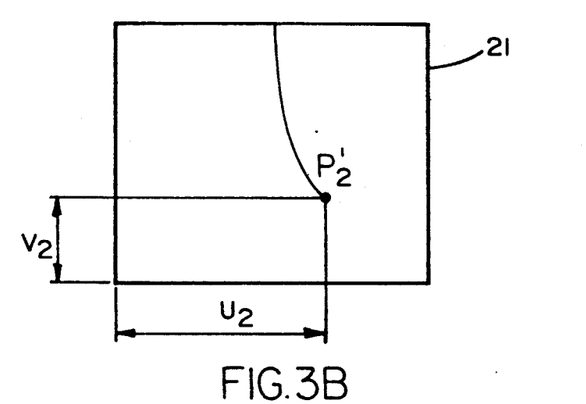
Figure 3C:
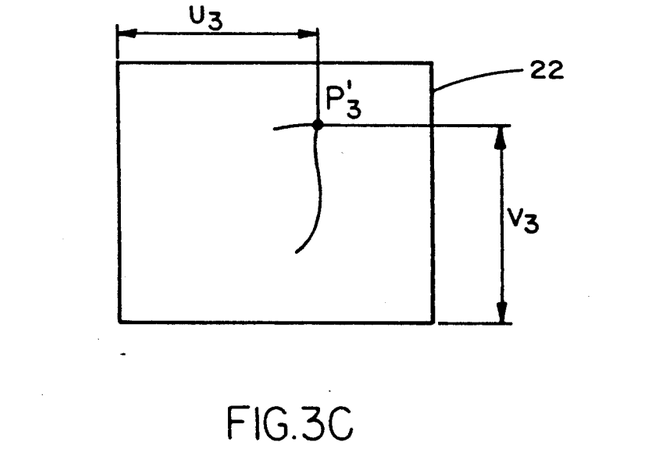

As described above, TV cameras 4, 6 and 8 capture the images projected by line markers 3, 5 and 7, respectively. The image signal output from each of TV cameras 4, 6 and 8 is supplied to position detection controller 9. In FIG. 2, a block diagram of position detection controller 9 is presented. The image signal supplied from TV camera 4 is provided to image processor 10 wherein the coordinates $(u_1, v_1)$ of point $P_1'$ relative to the image captured by TV camera 4 as shown in FIG. 3(a) are obtained, where point $P_1'$ corresponds to target point $P_1$ on workpiece $1_i$ as seen in FIG. 1. Similarly, the image signal supplied from TV camera 6 is provided to image processor 11 wherein the coordinates $(u_2, v_2)$ of target point $P_2'$ relative to the image captured by TV camera 6 as shown in FIG. 3(b) are obtained, and the image signal supplied from TV camera 8 is provided to image processor 12 wherein the coordinates $(u_3, v_3)$ of target point $P_3'$ relative to the image captured by TV camera 8 as shown shown in FIG. 3(c) are obtained, where points $P_2'$ and $P_3'$ corresponds to target points $P_2$ and $P_3$ on workpiece $1_i$ as seen in FIG. 1. The coordinate data $(u_i, v_i)i=1,2,3$ obtained in each of image processors 10, 11 and 12 are then supplied to mathematical processor 13.

Mathematical processor 13 has access to memory 14, wherein a number of constants are stored which express the geometrical relationship between each TV camera 4, 6 and 8, and the respective surfaces on workpiece $1_i$ visualized by each TV camera 4, 6 and 8. Put differently, memory 14 stores constants expressing the geometrical relationship between TV camera 4 and the portion of the surface of workpiece $1_i$ on which line marker 3 projects, between TV camera 6 and the portion of the surface of workpiece $1_i$ on which line marker 5 projects, and between TV camera 6 and the portion of the surface of workpiece $1_i$ on which line marker 7 projects.

Based on the coordinate data $(u_i, v_i)i=1,2,3$ supplied from image processors 10, 11 and 12 for points $P_1'$, $P_2'$ and $P_3'$, respectively, and the constant data stored in memory 14, mathematical processor 13 calculates coordinates $(U_i, V_i)i=1,2,3$ which are the two dimensional coordinates to which points $P_1'$, $P_2'$ and $P_3'$ correspond with respect to fixed coordinate system 2. That is, with respect to fixed coordinate system 2, coordinates $(U_1, V_1)$ are the coordinates which correspond to point $P_1'$ within the plane defined by $X=X_1$, coordinates $(U_2, V_2)$ are the coordinates which correspond to point $P_2'$ within the plane defined by $X=X_2$, and coordinates $(U_3, V_3)$ are the coordinates which correspond to point $P_3'$ within the plane defined by $Y=Y_3$.

Coordinates $(U_i, V_i)i=1,2,3$ calculated in mathematical processor 13 are then supplied to mathematical processor 15. Mathematical processor 15 has access to memory 16, wherein data describing the coordinates of the first, second and third detection planes with respect to fixed coordinate system 2 are stored. Based on the coordinate data $(U_i, V_i)i=1,2,3$ supplied from mathematical processor 13 and the data stored in memory 16, mathematical processor 15 calculates coordinates $P_i(x_i, y_i, z_i)i=1,2,3$ which are the three dimensional coordinates of target points $P_1$, $P_2$ and $P_3$ with respect to fixed coordinate system 2. Thus calculated, coordinate data $P_i(x_i, y_i, z_i)i=1,2,3$ are supplied to mathematical processor 17.

In mathematical processor 17, a coordinate conversion matrix T is formulated based on the supplied coordinate data, and based on data stored in memory 18 which expresses topological characteristics of workpiece $1_i$ in terms of a workpiece coordinate system which is fixed relative to workpiece $1_i$. By means of the above mentioned coordinate conversion matrix T, it becomes possible to convert coordinate data relative to the above mentioned workpiece coordinate system to coordinate data relative to fixed coordinate system 2. Thus calculated, coordinate conversion matrix T is supplied to robot controller 19 which acts to control robots etc. at the corresponding work station.

In the above discussion, line marker 7, TV camera 8 and image processor 12 correspond to the first detection means described in the summary of the present document. Similarly, line markers 3 and 5, TV cameras 4 and 6, and image processors 10 and 11 correspond to the second detection means. Likewise, memory 14 corresponds to the storage means, and memories 16 and 18, along with mathematical processors 13, 15 and 17 correspond to the computational means described in the summary of this document.

In the following, the operation of the above described position detection device of the first preferred embodiment of the present invention will be explained.

First of all, suitably selected target points $P_1$, $P_2$ and $P_3$ on workpiece $1_i$ are chosen. As shown in FIG. 1, target points $P_1$ and $P_2$ lie on one straight edge of the lower surface of workpiece $1_i$, and target points $P_3$ lies on one straight edge of the front surface of workpiece $1_i$. The above mentioned straight edge of the lower surface, and straight edge of the front surface of workpiece $1_i$ will be referred to as straight line l and straight line m, respectively, in the following discussion. With straight lines l and m as thus described, target point $P_1$ can be defined as the intersection of straight line l and the detection plane defined by $X=X_1$, target point $P_2$ can be defined as the intersection of straight line l and the detection plane defined by $X=X_2$, and target point $P_3$ can be defined as the intersection of straight line m and the detection plane defined by $Y=Y_3$.

After the images of target points $P_1$, $P_2$ and $P_3$ on workpiece $1_i$ are captured by TV cameras 4, 6 and 8, respectively, the captured images are displayed on video monitors 20, 21 and 22 as points $P_1'$, $P_2'$ and $P_3'$, respectively, as is shown in FIGS. 3(a), 3(b) and 3(c), respectively. Next, coordinate data $(u_i, v_i)i=1,2,3$ are calculated in image processors 10, 11 and 12, respectively, the results of which are then supplied to mathematical processor 13. Based on the coordinate data $(u_i, v_i)i=1,2,3$, and the data stored in memory 14, mathematical processor 13 calculates coordinates $(U_i, V_i)i=1,2,3$ which are then supplied to mathematical processor 15. In mathematical processor 15, based on the supplied coordinate data $(U_i, V_i)i=1,2,3$ and data describing the coordinates of the first, second and third detection planes with respect to fixed coordinate system 2 stored in memory 16, coordinate data $P_i(x_i, y_i, z_i)i=1,2,3$ are calculated which are the three dimensional coordinates of target points $P_1$, $P_2$ and $P_3$ with respect to fixed coordinate system 2. Thus calculated, coordinate data $P_i(x_i, y_i, z_i)i=1,2,3$ are supplied to mathematical processor 17.

As described previously, in mathematical processor 17, a coordinate conversion matrix T is formulated based on supplied coordinate data $P_i(x_i, y_i, z_i)i=1,2,3$, and on data stored in memory 18. By means of the above mentioned coordinate conversion matrix T, it becomes possible to convert coordinate data relative to the above mentioned workpiece coordinate system to coordinate data relative to fixed coordinate system 2. The method by which coordinate conversion matrix T is obtained will be next explained with reference to FIG. 4.

Figure 4:
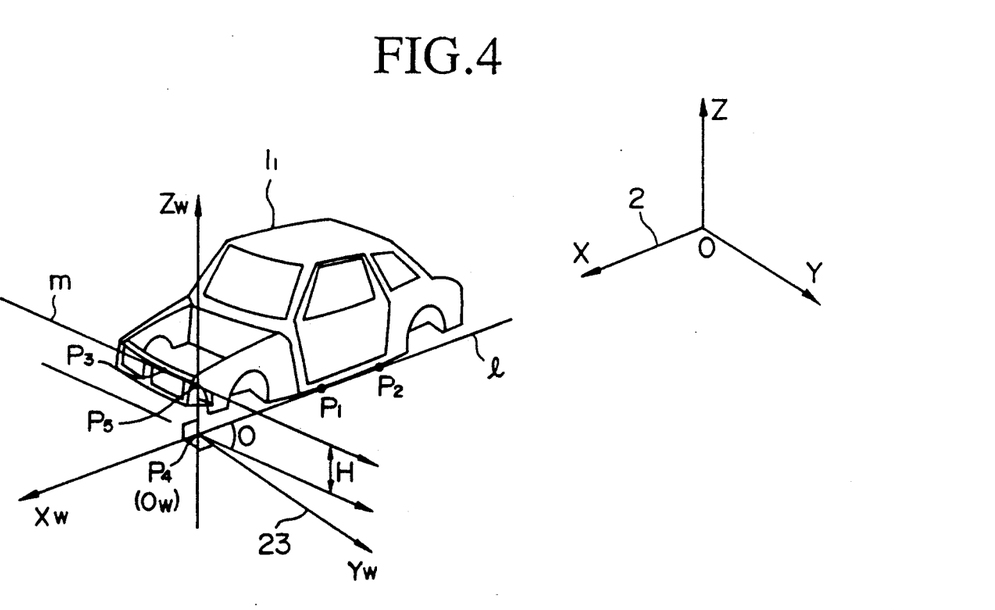
FIG. 4 is a drawing demonstrating the relationship between the coordinates for the position of an object and a straight edge present on the object, characteristic point detected by the apparatus shown in FIG. 1 and a display screen employed in the device.

Even if the external structure of workpiece $1_i$ is exceedingly complex, provided two straight lines, straight lines l and m, can be selected which are not parallel with respect to one another and for which the mutual geometric relationship thereof is known, the position and orientation of workpiece $1_i$ can be determined based on the position and orientation of straight lines l and m. Furthermore, the mutual geometric relationship of straight lines l and m can be described quite simply based on data expressing the angle $\theta$ described by the two lines and the distance H between the two lines at a defined point $P_4$ on line l and point $P_5$ on line m, this data being stored in memory 18.

From the coordinates of points $P_1$, $P_2$ and $P_3$, and the values for distance H and angle $\theta$, coordinate conversion matrix T and the coordinates of points $P_4$ and $P_5$ can be obtained based on the following assumptions and operations:

1. Distance H and angle $\theta$, as well as points $P_4$ and $P_5$ have been defined such that:
   a) points $P_1$, $P_2$ and $P_4$ are collinear;
   b) $\overleftarrow{P_1P_2}$ and $\overleftarrow{P_5P_4}$ are mutually perpendicular;
   c) $\overleftarrow{P_4P_5}$ and $\overleftarrow{P_5P_3}$ are mutually perpendicular;
   d) the angle described by $\overleftarrow{P_1P_2}$ and $\overleftarrow{P_3P_5}$ is equal to $\theta$;
   e) $|\overleftarrow{P_4P_5}|$ is equal to H.

2. By defining the origin $O_w$ such that it coincides with point $P_4$, the unit vectors for the X, Y and Z axes of a workpiece coordinate system 23 can be derived based on the following vector relationships:

a) $i = \dfrac{\overleftarrow{P_1P_2}}{|\overleftarrow{P_1P_2}|}$ b) $k = \dfrac{\overleftarrow{P_5P_4}}{|\overleftarrow{P_5P_4}|}$ c) j = k×i (vector product)

3. From the unit vectors for the X, Y and Z axes of workpiece coordinate system 23 thus obtained, coordinate conversion matrix T can be constructed as follows:

$$T = \begin{bmatrix} i & j & k & r \\ 0 & 0 & 0 & 1 \end{bmatrix}$$

In coordinate conversion matrix T as defined above, i, j and k represent unit vectors for the X, Y and Z axes, respectively, of workpiece coordinate system 23.

Further, r in the above matrix is given by the following matrix expression:

$$r = \begin{bmatrix} x_4 \\ y_4 \\ z_4 \end{bmatrix}$$

Thus derived, coordinate conversion matrix T can be used to convert from coordinates relative to workpiece coordinate system 23 to coordinates relative to fixed coordinate system 2, whereby the position of workpiece $1_i$ can be described.

It can therefore be seen that from the two straight lines defined by distance H and angle $\theta$, each of which coincides with one of two nonparallel straight edges on workpiece $1_i$, by knowing the intersection of the above mentioned two lines with a detection plane having a fixed, predetermined position relative to fixed coordinate system 2, and from the image projected thereon by a line marker which lies within the detection plane as captured by a TV camera positioned at a predetermined angle, the three dimensional coordinates of two predetermined points on one straight edge and one predetermined point on the other straight edge can be obtained, whereby the location of workpiece $1_i$ can be determined with six degrees of freedom.

After formulation thereof, a coordinate conversion matrix $T_0$ for guiding the operation of robots and the like at the work station is read from position detection controller 9 by robot controller 19, and stored in memory therein. During assembly or machining operations at the work station, a control program within robot controller 19 utilizes the coordinate conversion matrix $T_0$ so as to suitably guide the manufacturing operations at that workstation based on the determined position of the workpiece $1_i$. In this way, even when the position of workpiece $1_i$ deviates somewhat from the target position at the work station, robots or other devices at the work station can automatically adjust their operations so as to compensate for the deviation in position. As a result, each workpiece is uniformly milled, machined, etc., thereby permitting automated manufacturing with a high degree of efficiency and uniformity in the produced item.

In the following, a second preferred embodiment of the present invention will be described with reference to FIGS. 5 through 7.

Figure 5:
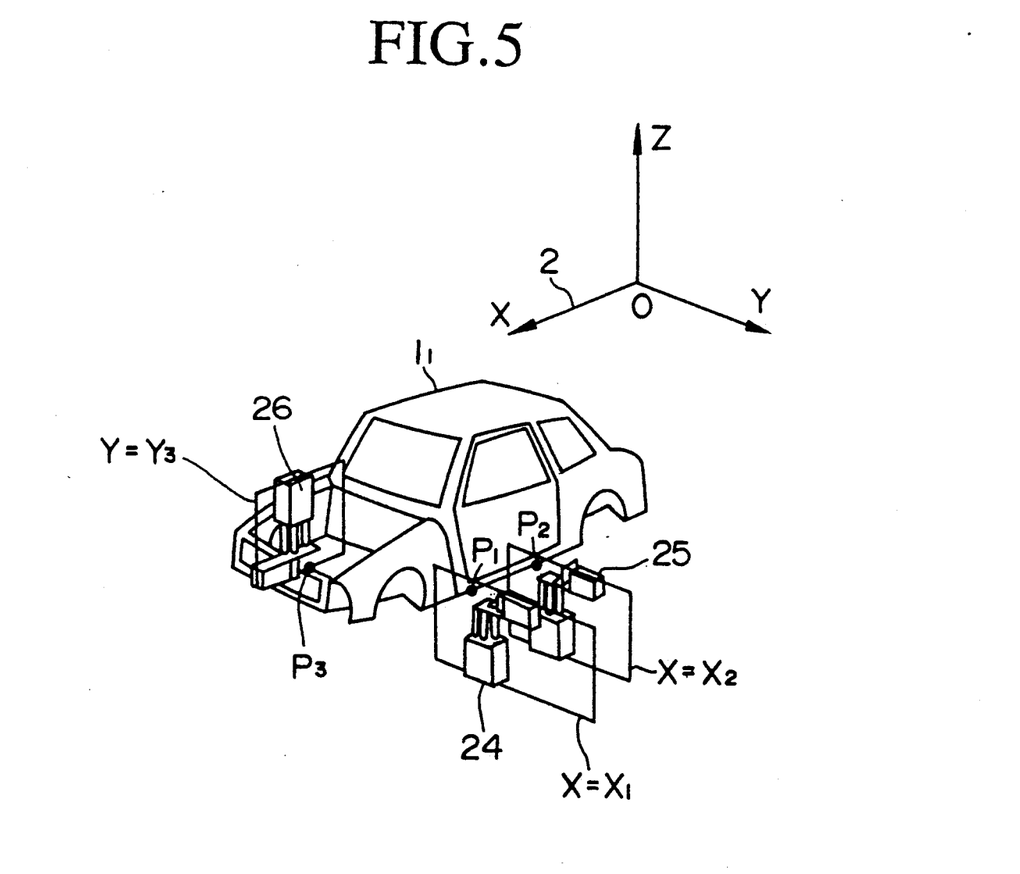
FIG. 5 is a schematic drawing showing the layout of a position detection device of a second preferred embodiment of the present invention.

A schematic drawing of of the position detection device of the present embodiment can be seen in FIG. 5, wherein a two dimensional movement detection device 24 is shown, by which means two dimensional movement of workpiece $1_i$ can be detected. In this case, the detection plane for two dimensional movement detection device 24 is parallel to the Y-Z plane of fixed coordinate system 2, and is described by the equation $X = X_1$. By means of two dimensional movement detection device 24, change in the Y and Z coordinates of workpiece $1_i$ in the detection plane described by $X = X_1$ is detected relative to fixed coordinate system 2. Similar to two dimensional movement detection device 24, two dimensional movement detection devices 25 and 26 are provided, whereby the Y and Z coordinates of workpiece $1_i$ in the detection plane described by $X = X_2$, and the X and Z coordinates of workpiece $1_i$ in the detection plane described by $Y = Y_3$ are obtained relative to fixed coordinate system 2.

Figure 6:
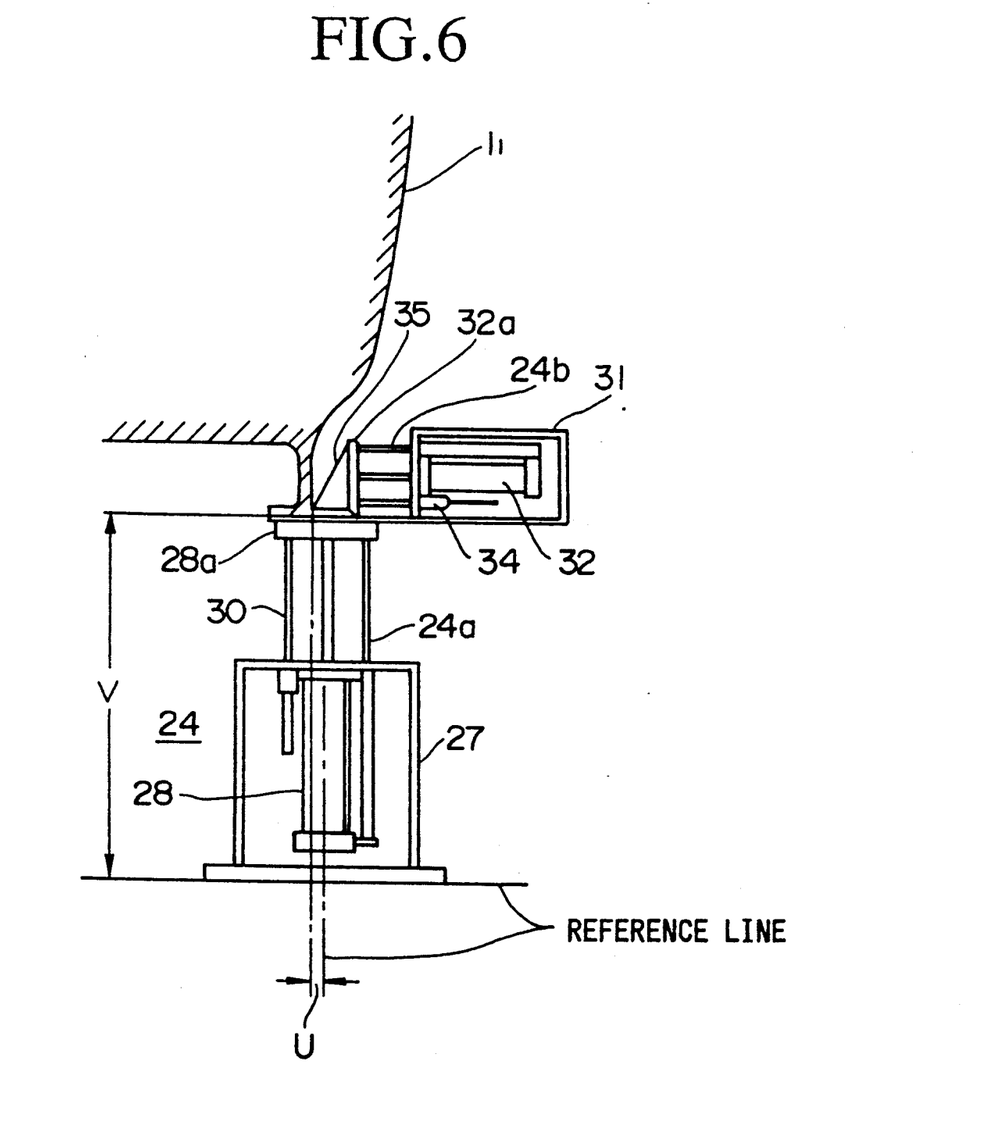
FIG. 6 is a schematic drawing showing a two dimensional position change measurement device employed in the position detection device shown in FIG. 5.

In FIG. 6, the structure of two dimensional movement detection device 24 can be seen. In this drawing, a U-shaped frame 27 which is mounted on the floor or ceiling can be seen in vertical section. Cylinder 28, linear potentiometer 24a and linear guide 30 are attached at the upper surface of frame 27. At the distal end of piston rod 28a of cylinder 28, the end of both linear potentiometer 24a and linear guide 30 are connected. Linear potentiometer 24a and linear guide 30 move up and down in concert with piston rod 28a of cylinder 28. In this way, movement of piston rod 28a is detected through the operation of linear potentiometer 24a. The connection between linear guide 30 and piston rod 28a is designed so as to prevent pivoting therebetween.

Piston rod 28a is provided on frame 31, whereon a cylinder 32, linear potentiometer 24b and linear guide 34 are mounted as well. On the end of piston rod 32a of cylinder 32, detection head 35 is mounted. Detection head 35 is mounted on linear potentiometer 24b so as to restrict pivoting therebetween, for which reason forward and rearward motion of detection head 35 is transmitted to linear potentiometer 24b wherein such movement is detected.

Two perpendicular reference lines are provided on the frame 27 of each of two dimensional movement detection devices 24, 25 and 26, such that when mounted at a given work station, the two reference lines of the frame 27 of two dimensional movement detection device 24 and the two reference lines of frame 27 of two dimensional movement detection device 25 all are parallel to the Y-Z plane relative to fixed coordinate system 2, whereas the two reference lines of frame 27 of two dimensional movement detection device 26 are both parallel to the X-Z plane. In this way, during operation, the portion of each detection head 35 in contact with workpiece $1_i$ line in the plane described by the two standard lines which correspond to that two dimensional movement detection device 24, 25 or 26.

Each of two dimensional movement detection devices 24, 25 and 26 have the same structure, while in the case of two dimensional movement detection devices 25, a linear potentiometer 25a is mounted on frame 27 and a linear potentiometer 25b is mounted on frame 31, whereas in the case two dimensional movement detection devices 26, a linear potentiometer 26a is mounted on frame 27 and a linear potentiometer 26b is mounted on frame 31. The output of the potentiometers of each of two dimensional movement detection devices 24, 25 and 26 are supplied to a position detector controller 36 which will be explained below.

Figure 7:
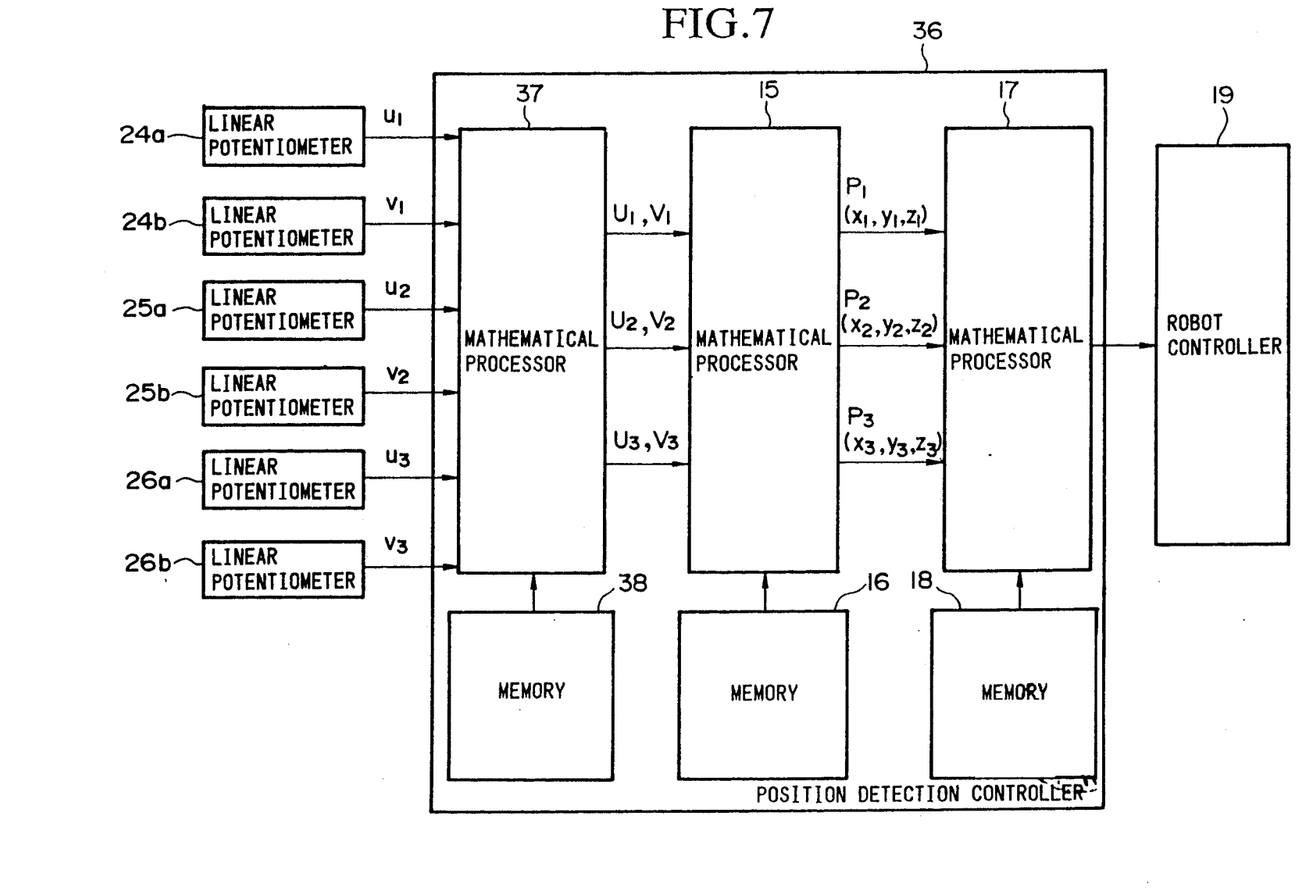
FIG. 7 is a block drawing showing a controller employed in the position detection device shown in FIG. 5.

In FIG. 7, a block diagram can be seen showing the general layout of position detector controller 36. Those elements in FIG. 7 which are identical to the corresponding components in the apparatus of the first preferred embodiment of the present invention as shown in FIG. 2 will retain their original identifying number. A mathematical processor 37 receives the output of each linear potentiometer 24a through 26a and linear potentiometer 24b through 26b.

Mathematical processor 37 has access to memory 38, wherein data are stored which express the relationship between the output signals of each linear potentiometer 24a-26a, 24b-26b and the respective surfaces on workpiece $1_i$ of which each two dimensional movement detection devices 24, 25 and 26 is in contact. In this way coordinate data $(U_i, V_i) i=1,2,3$ are calculated and output from mathematical processor 37, after which the coordinate data thus output is then supplied to mathematical processor 15.

Although not shown in the drawings, position detector controller 36 includes six cylinder control units which are used for turning cylinders on and off. In the device of the present embodiment, the first detection means described in the summary of this document includes two dimensional movement detection device 26, a mathematical processor 15 and 37, and memory 16 and 38, whereas the second detection means described in the summary of this document includes two dimensional movement detection devices 24 and 25, a mathematical processor 15 and 37, and memory 16 and 38.

In the following, the operation of the above described position detection device of the second preferred embodiment of the present invention will be explained.

First of all, a workpiece $1_i$ is conveyed to the work station, whereupon a detector is triggered which indicates the presence of a workpiece, whereby the conveying device is halted. Next, the piston rod of each cylinder 28 of two dimensional movement detection devices 24, 25 and 26 extends and then stops, either after a predetermined time interval has elapsed or after the rate of change of resistance of linear potentiometers 24a, 25a and 26a drops to a predetermined value. Then, the piston rod of each cylinder 32 of two dimensional movement detection devices 24, 25 and 26 extends and then stops, either after a predetermined time interval has elapsed or after the rate of change of resistance of linear potentiometers 24b, 25b and 26b drops to a predetermined value. In this way, the lower portions of the detection heads 35 of two dimensional movement detection devices 24 and 25 come to be in contact with a straight edge on the lower surface of workpiece $1_i$ at two points $P_1$, $P_2$, and the detection head 35 of two dimensional movement detection device 26 come to be in contact with a straight edge on the front surface of workpiece $1_i$ at point $P_3$. At this point, the output value of each linear potentiometer $24a$-$26a$, $24b$-$26b$ as coordinate data $(u_i, v_i) i=1,2,3$ is supplied to mathematical processor 37, whereupon coordinates $(U_i, V_i) i=1,2,3$ are calculated and output to mathematical processor 15.

In order to obtain coordinates $(U_i, V_i) i=1,2,3$ in mathematical processor 37, the following equations are solved:

$$U_i = K_i^\mu u_i + C_i^\mu$$

$$V_i = K_i^\nu v_i + C_i^\nu$$

such that i=1, 2, 3. In the above equations, $U_i$ and $V_i$ represent the coordinates of the amount of displacement of each respective two dimensional movement detection device 24, 25, 26 from the position indicated the two reference lines of each two dimensional movement detection device 24, 25, 26, as is shown in FIG. 6. Coefficients $K_i^\mu$, $K_i^\nu$, $C_i^\mu$, $C_i^\nu$ are decided based on the configuration of each two dimensional movement detection device 24, 25, 26, and have been previously stored in memory 38 which is shown in FIG. 7.

Next, after mathematical processor 37 supplies coordinate data $(U_i, V_i) i=1,2,3$ to mathematical processor 15, based on the supplied coordinate data $(U_i, V_i) i=1,2,3$ and data describing the coordinates of the first, second and third detection planes with respect to fixed coordinate system 2 stored in memory 16, coordinate data $P_i(x_i, y_i, z_i) i=1,2,3$ are calculated which are the three dimensional coordinates of target points $P_1$, $P_2$ and $P_3$ with respect to fixed coordinate system 2. Thus calculated, coordinate data $P_i(x_i, y_i, z_i) i=1,2,3$ are supplied to mathematical processor 17, wherein coordinate conversion matrix T is formulated based on supplied coordinate data $P_i(x_i, y_i, z_i) i=1,2,3$, and on data stored in memory 18, just as in the case of the first preferred embodiment. After coordinate conversion matrix T is thus obtained, the piston rod of each cylinder 32 retracts, then after a predetermined interval, the piston rod of each cylinder 28 retracts.

Because position assessment in this preferred embodiment involves direct contact with the workpiece $1_i$, further improvements in the accuracy of position detection are possible.

What is claimed is:
1. A position detection device for detecting the position in a work space of an object having at least two non-parallel straight edges comprising:
   a) first position detection means for detecting a point of intersection of a line containing a first straight edge of the workpiece and a first detection plane defined within the work space;
   b) second position detection means for detecting the point of intersection of a line containing a second straight edge of the workpiece which is different from said first straight edge and a second and a third detection plane defined within said work space;

c) first storage means for storing first coordinates representing the geometric relationship between said first straight edge and said second straight edge, d) second storage means for storing second coordinates of said first, second, and third detection planes; and e) computational means for calculating the three dimensional position and orientation of said workpiece based on the first coordinates stored in said first storage means, the second coordinates stored in said second storage means and the coordinates of the points of intersection detected by said first position detection means and said second position detection means.

2. A position detection device in accordance with claim 1 above, wherein position detection is carried out such that there is no physical contact with said object.

3. A position detection device in accordance with claim 1 above,
wherein said first position detection means further comprises:
i) first line marker means for projecting a linear first mark on a first surface of said workpiece;
ii) first image capturing means for capturing an image of said first mark projected on said workpiece, said first image capturing means having an optical axis, said image capturing means positioned such that the optical axis of said first image capturing means forms an oblique angle with an optical axis of said first line marker means; and
iii) first image processing means for processing an image captured by said first image capturing means, thereby determining coordinates of a first predetermined point on said work piece.

4. A position detection device in accordance with claim 1 above,
wherein said second position detection means further comprises:
i) second and third line marker means for projecting a linear second and third mark on a second surface of said workpiece which is different from said first surface;
ii) second and third image capturing means for capturing an image of said second and third marks, respectively, projected on said workpiece, said second and third image capturing means each having an optical axis, said second and third image capturing means each positioned such that the optical axis of said second and third image capturing means forms an oblique angle with an optical axis of said second and third line marker means, respectively; and
iii) second and third image processing means for processing an image captured by said second and third image capturing means, respectively, thereby determining coordinates of a second and third predetermined point on said work piece.

5. A position detection device in accordance with claim 1
a) wherein said first position detection means further comprises:
i) first line marker means for projecting a linear first mark on a first surface of said workpiece;
ii) first image capturing means for capturing an image of said first mark projected on said workpiece, said first image capturing means having an optical axis, said image capturing means positioned such that the optical axis of said first image capturing means forms an oblique angle with an optical axis of said first line marker means; and
iii) first image processing means for processing an image captured by said first image capturing means, thereby determining coordinates of a first predetermined point on said work piece;

b) and wherein said second position detection means further comprises:
i) second and third line marker means for projecting a linear second and third mark on a second surface of said workpiece which is different from said first surface;
ii) second and third image capturing means for capturing an image of said second and third marks, respectively, projected on said workpiece, said second and third image capturing means each having an optical axis, said second and third image capturing means each positioned such that the optical axis of said second and third image capturing means forms an oblique angle with an optical axis of said second and third line marker means, respectively; and
iii) second and third image processing means for processing an image captured by said second and third image capturing means, respectively, thereby determining coordinates of a second and third predetermined point on said work piece.

6. A position detection device in accordance with claim 5 above, wherein at least one of said first, second and third line marker means includes a laser light source.

7. A position detection device in accordance with claim 1 above, wherein position detection is carried out through physical contact with said object.

8. A position detection device in accordance with claim 1 above,
wherein said first position detection means further comprises:
i) first tactile sensor for contacting said workpiece at a first point on a first surface of said workpiece;
ii) first tactile data generating means for generating tactile data based on a position of said first tactile sensor when said first tactile sensor makes contact with said workpiece at said first point; and
iii) first tactile data processing means for processing tactile data generated by said first tactile data generating means, thereby determining coordinates of a first predetermined point on said workpiece.

9. A position detection device in accordance with claim 1 above,
wherein said second position detection means further comprises:
i) second and third tactile sensors for contacting said workpiece at a second and third point on a second surface of said workpiece which is different from said first surface;

ii) second and third tactile data generating means for generating tactile data based on a position of said second and third tactile sensors when said second and third tactile sensors makes contact with said workpiece at said second and third points, respectively; and iii) second and third tactile data processing means for processing tactile data generated by said second and third tactile data processing means, respectively, thereby determining coordinates of a second and third predetermined point on said workpiece.

10. A position detection device in accordance with claim 1 above, a) wherein said first position detection means further comprises:
   i) first tactile sensor for contacting said workpiece at a first point on a first surface of said workpiece;
   ii) first tactile data generating means for generating tactile data based on a position of said first tactile sensor when said first tactile sensor makes contact with said workpiece at said first point; and
   iii) first tactile data processing means for processing tactile data generated by said first tactile data generating means, thereby determining coordinates of a first predetermined point on said workpiece;

b) and wherein said second position detection means further comprises:
   i) second and third tactile sensors for contacting said workpiece at a second and third point on a second surface of said workpiece which is different from said first surface;
   ii) second and third tactile data generating means for generating tactile data based on a position of said second and third tactile sensors when said second and third tactile sensors makes contact with said workpiece at said second and third points, respectively; and
   iii) second and third tactile data processing means for processing tactile data generated by said second and third tactile data processing means, respectively, thereby determining coordinates of a second and third predetermined point on said workpiece.

11. A position detection device in accordance with claim 10 above, wherein at least one of said first, second and third tactile data generating means consists of a potentiometer which outputs electric output signals proportional to mechanical movement of said workpiece.

12. A position detection device in accordance with claim 1, wherein said first storage means stores data representing a distance and an angle between said first straight edge and said second straight edge.

* * * * *